(12) United States Patent
Hollins et al.

(10) Patent No.: US 7,639,633 B2
(45) Date of Patent: Dec. 29, 2009

(54) APPARATUS AND METHOD FOR SETTING UP A CONFERENCE CALL

(75) Inventors: Martyn Hollins, Maidenhead (GB); Robert Turner, Wokingham (GB); Paul Kettlewell, Aylesbury (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 1054 days.

(21) Appl. No.: 11/010,908

(22) Filed: Dec. 13, 2004

(65) Prior Publication Data

US 2006/0126539 A1 Jun. 15, 2006

(51) Int. Cl.
H04L 12/16 (2006.01)
(52) U.S. Cl. ............. 370/260; 370/432; 348/14.09; 379/201.05; 379/202.01; 709/204
(58) Field of Classification Search ........... 370/260, 370/466, 522, 261, 289, 336, 341, 352, 401, 370/432; 379/202.01, 35, 67.1, 93.35, 201.05; 455/416, 518, 519; 705/10; 709/228, 204; 348/14.09

See application file for complete search history.

(56) References Cited

U.S. PATENT DOCUMENTS

| | | | | |
|---|---|---|---|---|
| 5,408,526 A * | 4/1995 | McFarland et al. | 379/202.01 |
| 5,550,906 A * | 8/1996 | Chau et al. | 379/201.05 |
| 5,625,407 A * | 4/1997 | Biggs et al. | 348/14.11 |
| 5,675,583 A * | 10/1997 | Bales et al. | 370/261 |
| 5,710,591 A * | 1/1998 | Bruno et al. | 348/14.09 |
| 5,859,979 A * | 1/1999 | Tung et al. | 709/228 |
| 6,157,401 A * | 12/2000 | Wiryaman | 348/14.09 |
| 6,304,648 B1 * | 10/2001 | Chang | 379/202.01 |
| 6,308,079 B1 * | 10/2001 | Pan et al. | 455/519 |
| 6,324,169 B1 * | 11/2001 | Roy | 370/260 |
| 6,370,137 B1 * | 4/2002 | Lund | 370/352 |
| 6,421,324 B1 * | 7/2002 | Boyle et al. | 370/261 |
| 6,545,995 B1 * | 4/2003 | Kinnunen et al. | 370/341 |
| 6,671,262 B1 * | 12/2003 | Kung et al. | 370/260 |
| 6,687,234 B1 * | 2/2004 | Shaffer et al. | 370/260 |
| 6,731,609 B1 * | 5/2004 | Hirni et al. | 370/260 |
| 6,754,224 B1 * | 6/2004 | Murphy | 370/432 |
| 6,760,332 B1 * | 7/2004 | Vladescu et al. | 370/395.1 |
| 6,891,809 B1 * | 5/2005 | Ciccone et al. | 370/289 |
| 6,996,221 B1 * | 2/2006 | Baiyor et al. | 379/202.01 |
| 6,999,478 B2 * | 2/2006 | D'Angelo | 370/522 |
| 7,010,108 B2 * | 3/2006 | DelHoyo et al. | 379/202.01 |
| 7,031,448 B2 * | 4/2006 | Coffman et al. | 379/202.01 |
| 7,133,514 B1 * | 11/2006 | Cook et al. | 379/202.01 |
| 7,251,231 B2 * | 7/2007 | Gubbi | 370/336 |
| 7,257,199 B2 * | 8/2007 | Carlson et al. | 379/35 |
| 7,295,852 B1 * | 11/2007 | Davis et al. | 455/518 |
| 7,317,791 B2 * | 1/2008 | Carlson | 379/202.01 |
| 7,328,240 B2 * | 2/2008 | El-Gebaly et al. | 709/204 |
| 7,411,975 B1 * | 8/2008 | Mohaban | 370/466 |
| 2001/0005372 A1 * | 6/2001 | Cave et al. | 370/401 |

(Continued)

Primary Examiner—Gerald Gauthier
(74) Attorney, Agent, or Firm—Barnes & Thornburg LLP

(57) ABSTRACT

A method of provisioning a conference call in order to preserve bandwidth on a network, and thereby allowing a larger number of participants to actively take part in a conference call. The method includes providing all participants in a conference call with a simplex connection to the conference call so that they can hear what is being said. It further comprises allocating further bandwidth so at least one participant can address the conference at any one time.

13 Claims, 2 Drawing Sheets

U.S. PATENT DOCUMENTS

| | | | |
|---|---|---|---|
| 2002/0196781 A1* | 12/2002 | Salovuori | 370/352 |
| 2004/0179092 A1* | 9/2004 | LaPoint | 348/14.08 |
| 2004/0190701 A1* | 9/2004 | Biage | 379/202.01 |
| 2005/0038692 A1* | 2/2005 | Kane et al. | 705/10 |
| 2005/0124328 A1* | 6/2005 | Thomas et al. | 455/416 |
| 2007/0230672 A1* | 10/2007 | Carlson et al. | 379/93.35 |
| 2007/0274470 A1* | 11/2007 | Crockett et al. | 379/67.1 |

* cited by examiner

APPARATUS AND METHOD FOR SETTING UP A CONFERENCE CALL

FIELD OF THE INVENTION

This invention relates to a method of setting up a conference call. The invention is applicable for use within an IP network.

BACKGROUND OF THE INVENTION

When a conventional conference call is set up within a communications network a Virtual Call Admissions Control (VCAC) on a server controlling the call will allocate bandwidth to the conference call according to rules set up on the server. The VCAC is responsible for monitoring the use of bandwidth within the network and permitting or denying calls according to the amount of available bandwidth.

Typically, when a conference call is set up on the network the VCAC will apply the assumption that each participant in the conference call requires a duplex link, i.e. a link which allows a user simultaneously both to listen to the conference and to be heard, when calculating the amount of bandwidth to allocate the conference call. However, as only one person is likely to be speaking at any one time the majority of this bandwidth allocation will remain unused due to silence suppression on the remaining lines.

This results in other calls which are requested to be set up after such a conference call has been set up, being refused by the VCAC even though it is highly likely that there is available bandwidth for transmitting one or more additional call. Furthermore, such bandwidth overprovisioning places a limit on the number of participants which can take part in the conference call.

Another way to try to solve the above problem is to estimate the bandwidth usage of the conference call at some value less than that required for a full set of duplix links. In this way a more realistic provisioning of the link for new calls which are subsequently made can be achieved. However, once the estimate has been made there is typically no way to enforce bandwidth restrictions on the conference call.

Therefore, the VCAC may set up new calls using the conference call's assumed bandwidth to estimate the amount of available bandwidth. If the conference call exceeds this bandwidth it is likely that the Quality of Service of the call is reduced resulting in impaired reception of any calls being transmitted down the link on which bandwidth has been exceeded.

SUMMARY OF THE INVENTION

According to a first aspect of the invention there is provided a method of setting up a conference call amongst a plurality of endpoints using Virtual Call Admissions Control (VCAC) comprising the steps of requesting a conference call to be set up; requesting bandwidth allocation from the VCAC for a simplex connection for each participating endpoint and a single duplex connection; each endpoint having silence suppression capability; removing silence suppression from a participant's endpoint when said participant starts speaking; and the server requesting bandwidth allocation from the VCAC to allow a simplex connection to be converted to a duplex connection temporarily during removal of silence suppression for said participant.

By allocating only a simplex connection to each participant, the bandwidth requirements for the conference are dramatically reduced. The single duplex connection is typically allocated to the host of the conference to allow adequate chairing of the conference.

Usually conference participants will wish to interject during a discussion (although this may not be essential for example in a webcast-type scenario). By allowing for silence suppression to trigger a temporary allocation of a duplex connection, conference participants are able to contribute and interject at appropriate times.

Optionally, certain participants may be allocated permanent duplex connections as would typically be done for the conference host.

By allowing the VCAC to operate in this way, appropriate account is taken of the fact that most conference participants are listening most of the time. Practically speaking, very few participants can talk at the same time without the conference becoming an unintelligible mass of noise and voices. By allowing the network apparatus to follow this real world situation, dramatic savings in bandwidth allocations may be achieved resulting in cost reductions or improvements in revenue streams to be achieved through reductions in network provisioning or selling of additional network bandwidth respectively.

In a second aspect the invention provides a call server connected to a network adapted to control a conference call between parties connected to said network, said network comprising a Virtual Call Admissions Control (VCAC), said call server comprising an input for receiving a request to set up said conference call; a processor for determining the number of parties participating in said conference call; and an output for requesting bandwidth allocation for said conference call from said VCAC, said bandwidth allocation substantially corresponding to the bandwidth for a simplex connection for each participating party and a duplex connection.

In a further aspect, the invention provides computer software which when executed on a call server causes the server to carry out the steps of receiving a request to set up a conference call, determining the number of parties participating in said conference call, and requesting bandwidth allocation for said conference call from a VCAC, said bandwidth allocation corresponding to the bandwidth for a simplex connection for each participating party and a duplex connection.

Other aspects and features of the present invention will become apparent to those ordinarily skilled in the art upon review of the following description of specific embodiments of the invention in conjunction with the accompanying figures.

DETAILED DESCRIPTION OF PREFERRED EMBODIMENTS

When a user (the call's host) decides to set up a conference they may dial a call server and then call all the other parties in turn in order to join the parties to the conference call being provisioned by the server. Alternatively the user may instruct the call server to dial all the parties in order to connect them to a conference call at a predetermined time set by the user.

On setting up a conference call the user will specify the number of participants in the call. This allows the call server to request the appropriate allocation of bandwidth from a Virtual Call Admission Control unit (VCAC). The VCAC may be present on the server or externally. The VCAC has knowledge of both the topology of the network and the availability of bandwidth on the network according to the number of calls being provisioned by the network. Using this knowledge the VCAC will permit or deny the conference call to be made based on the requirements above.

One way in which a conference call may be provisioned in order to provide more available bandwidth is, when setting up the conference call the user can specify that some participants are allocated a simplex connection to the conference call. The participants allocated a simplex connection can only listen to the conference call and cannot speak to the conference. The remaining participants are allocated a duplex connection and are, therefore, able to both listen to and speak to the conference.

A simplex connection requires less bandwidth than a duplex connection and, therefore, a conference call having some participants with simplex connections will require less bandwidth than a traditional conference call, allowing more participants to take part in the conference call.

Figure 1:
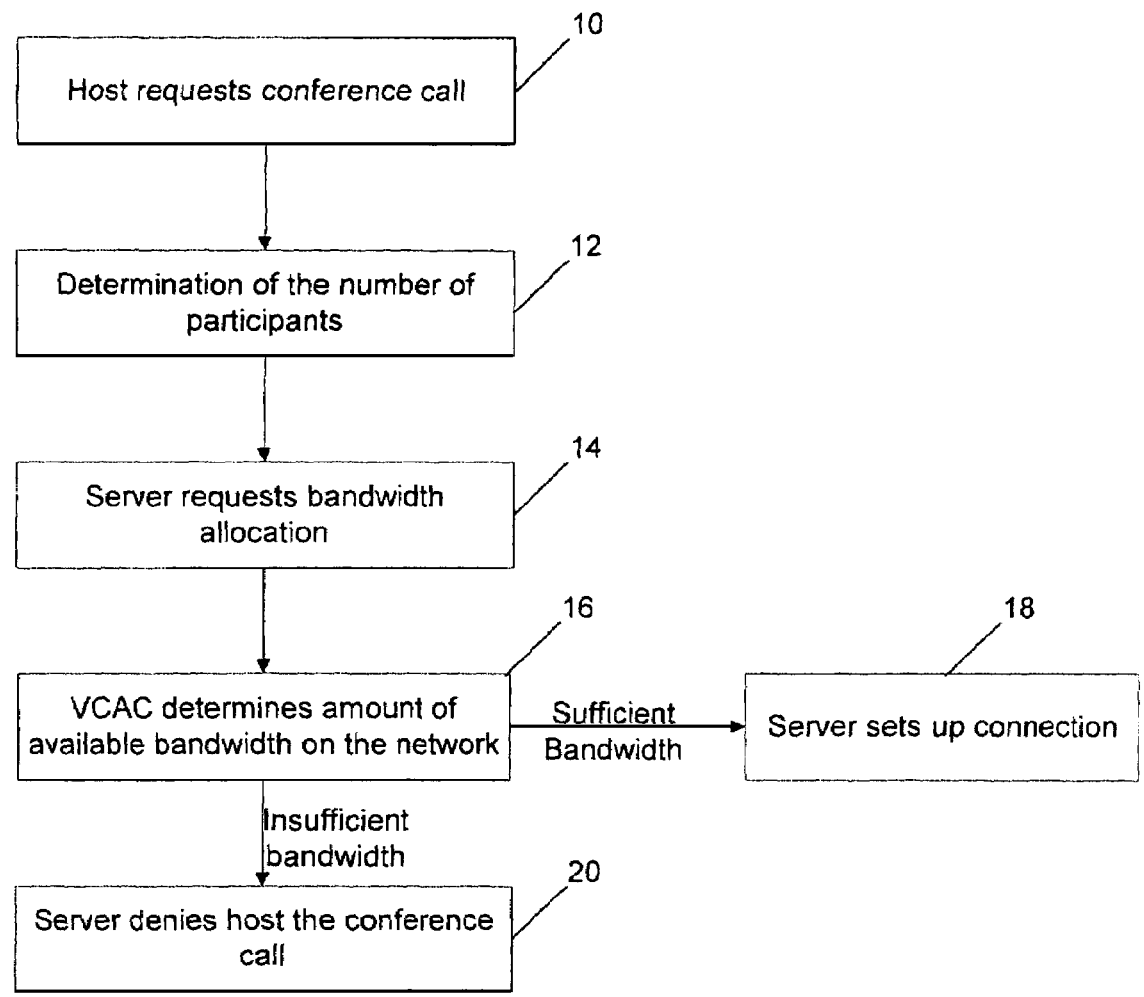
FIG. 1 is a flow chart showing call set-up in accordance with the invention.

An alternative method of setting up a conference call is illustrated in FIG. 1. In FIG. 1, the call server, on receiving a request to set up a conference call as shown in Step 10, will determine the amount of bandwidth required to provide each party participating in the call with a simplex connection to the conference as shown in Step 12. The call server will then request allocation of sufficient bandwidth in order to provide every participant in the call with a simplex connection and to allow at least one participant to speak at any one time, i.e. sufficient bandwidth to temporarily convert a simplex connection into a duplex connection. This is shown in Step 14.

Preferably the call server will also provide for a duplex connection to the host setting up the conference call or another specified person. This allows the call's host to moderate and control the call.

The VCAC will determine in Step 16, with reference to the amount of available bandwidth on the network, whether there is sufficient bandwidth to allow the connection. If there is sufficient bandwidth the server sets up the call, as shown in Step 18, if there is not sufficient bandwidth the server denies the call, as shown in Step 20.

On being joined to the conference call each participant is provided with a simplex connection allowing the participant to receive data packets and thereby hear the conference. Each participant's endpoint, including the host's, is provided with a speech activity detector which enables silence suppression to be carried out by the endpoint. Silence suppression prevents any data packets from being generated when the user is not speaking. In this way the endpoint can prevent transmission of background noise to the whole of the conference.

Figure 2:
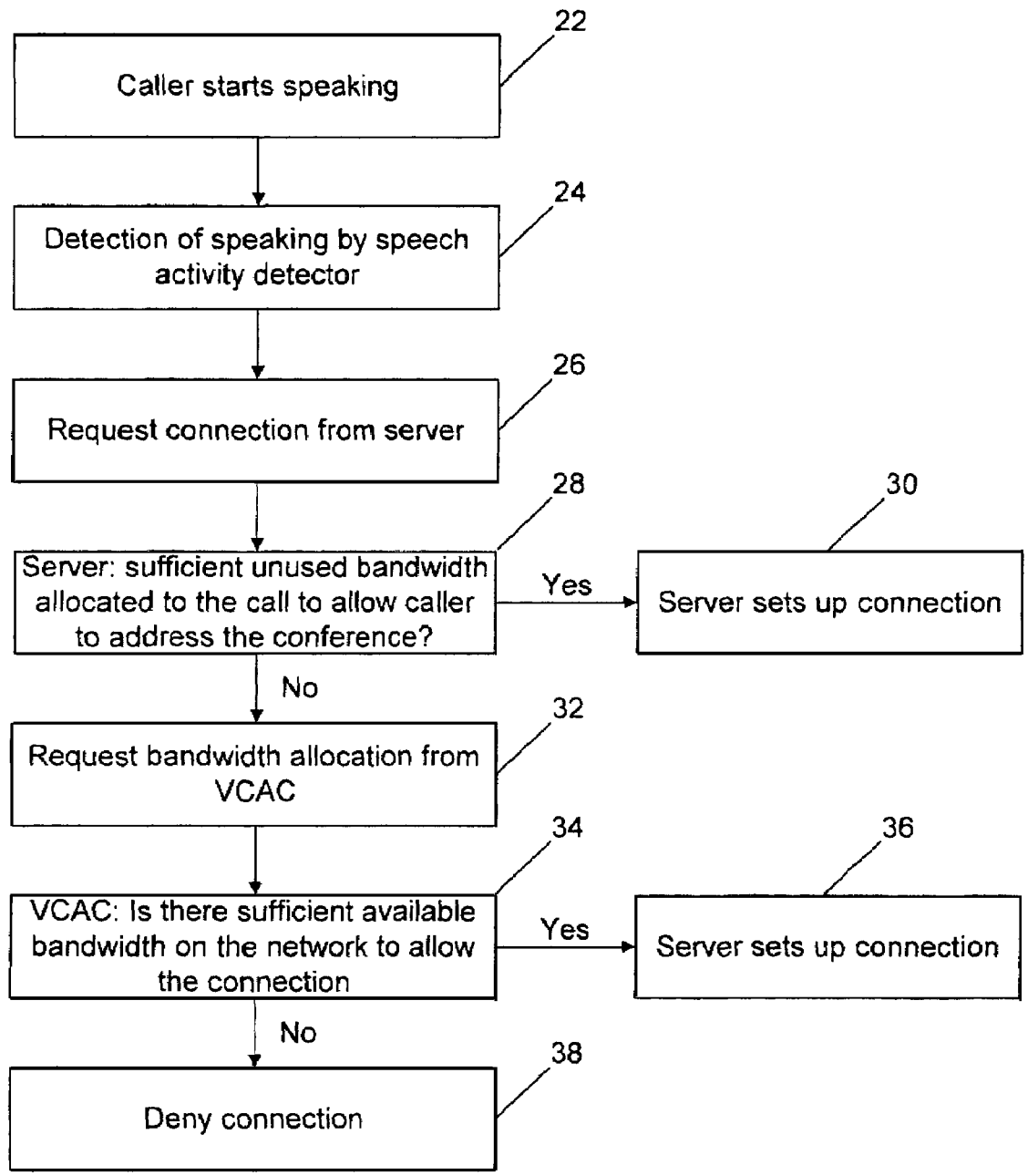
FIG. 2 is a flow chart showing dynamic bandwidth allocation during conference in accordance with the invention.

As illustrated in FIG. 2, when a participant starts speaking, Step 22, this is detected by the speech activity detector, Step 24, and the endpoint sends a request to the call server to set up a duplex connection, Step 26. If no other party, or a party with a duplex connection allocated to it, is speaking then the server will determine that there is sufficient unused bandwidth allocated to the conference call to allow the participant to transmit packets across the network as shown in Step 28. In this case the server automatically alters the connection to allow the party to transmit packets to the conference and thereby be heard by conference participants, Step 30.

If another party is speaking, or all the bandwidth allocated for the call is being used, then the call server requests further bandwidth allocation from the VCAC, Step 32, in order to set up a duplex connection between an endpoint and the call server. If the VCAC in Step 34 determines that there is sufficient bandwidth on the network then the server will allow the endpoint to remove silence suppression and transmit packets across the network, Step 36. In this way the participant can be heard over the conference. If, however, there is not sufficient bandwidth to allow the connection to be set up, the server will deny the connection and silence suppression will not be removed, Step 38.

Once a participant stops speaking, the speech activity detector reapplies silence suppression and notifies the call server. The call server then notifies the VCAC that the participant has stopped speaking and no longer requires the bandwidth allocation and the VCAC can use this information to update its tables on bandwidth availability and therefore take it into account when deciding whether or not to allow a further connection to be made.

Knowledge of the use of silence suppression by endpoints enables the server to more realistically estimate the bandwidth requirements of the conference call by assuming there will be a simplex connection to each of the participants in the call. However, using the method above any participant can address the conference call by having a duplex connection temporarily set up when they start speaking. If any of the participants have been allocated a duplex connection by the call server then they will be able to speak over the conference whenever they wish.

If an additional participant wishes to be connected to the network then the call server is notified of the participant's intention to join. The call server then notifies the VCAC of the request which will, according to the availability of bandwidth on the network, either allow or deny a simplex connection. As only a simplex connection is required the limit on the number of active participants which can take part in a call is able to be set higher than if all connections were allocated a duplex connection. This makes more efficient use of available bandwidths.

What is claimed is:

1. A method of setting up a conference call amongst a plurality of endpoints using Virtual Call Admissions Control (VCAC), each endpoint having silence suppression negotiation capability, the method comprising the steps of causing a call server to:
   (i) request a conference call to be set up
   (ii) request bandwidth allocation from the VCAC for a simplex connection for each participating endpoint and a single duplex connection;
   (iii) remove silence suppression from a participant's endpoint when said participant starts speaking; and
   (iv) request bandwidth allocation from the VCAC to allow a simplex connection to be converted to a duplex connection temporarily during removal of silence suppression for said participant.

2. A method of setting up a conference call according to claim 1 further comprising the step of allocating a participant a permanent duplex connection.

3. A method of setting up a conference according to claim 1 wherein if more than one participant speaks the server requests a further bandwidth allocation from the VCAC to enable all speaking parties to be heard by the conference.

4. A method of setting up a conference call according to claim 1 wherein if an additional party wishes to join said conference call, said server requests bandwidth allocation from said VCAC to set up a simplex connection to said additional party.

5. A method of setting up a conference calf according to claim 1 wherein silence suppression is reapplied when said participant stops speaking.

6. A method of setting up a conference call according to claim 5 wherein said duplex connection is converted to a simplex connection when said silence suppression is reapplied.

7. A method of setting up a conference call according to claim 1 wherein the bandwidth allocated to a participating endpoint is released when said endpoint disconnects from said conference call.

8. A method of setting up a conference call amongst a plurality of endpoints using Virtual Call Admissions Control (VCAC) comprising the steps of:
   (v) requesting a conference call to be set up
   (vi) requesting bandwidth allocation from the VCAC for a simplex connection for a selected participating endpoint;
   (vii) requesting bandwidth allocation from the VCAC for a duplex connection for any other participating endpoints.

9. A call server connected to a network adapted to control a conference call between parties connected to said network, said network comprising a Virtual Call Admissions Control (VCAC), said call server comprising:
   (viii) an input for receiving a request to set up said conference call;
   (ix) a processor for determining the number of parties participating in said conference call; and
   (x) an output for requesting bandwidth allocation for said conference call from said VCAC, said bandwidth allocation substantially corresponding to the bandwidth for a simplex connection for each participating party and a duplex connection.

10. A call server as claimed in claim 8 further comprising:
    (xi) an input for receiving a request for a duplex connection from a party;
    (xii) a processor for determining whether the bandwidth allocation from the VCAC for the duplex connection is being used; and
    (xiii) an output for setting up said connection if said bandwidth allocation is not being used.

11. A call server as claimed in claim 9 further comprising means for requesting additional bandwidth allocation from the VCAC if there is not sufficient bandwidth to allow a duplex connection to be set up.

12. A call server as claimed in claim 8 further comprising means for requesting additional bandwidth allocation on receipt of a request for connection to said conference call by a party which is not yet a participant in said conference call.

13. A computer readable medium embedded with a computer program which, when executed on a call server, causes the call server to carry out the steps of:
    (i) receiving a request to set up a conference call,
    (ii) determining the number of parties participating in said conference call, and
    (iii) requesting bandwidth allocation for said conference call from a VCAC, said bandwidth allocation corresponding to the bandwidth for a simplex connection for each participating party and a duplex connection.

* * * * *

UNITED STATES PATENT AND TRADEMARK OFFICE
CERTIFICATE OF CORRECTION

PATENT NO.      : 7,639,633 B2
APPLICATION NO. : 11/010908
DATED           : December 29, 2009
INVENTOR(S)     : Hollins et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1415 days.

Signed and Sealed this

Ninth Day of November, 2010

David J. Kappos
*Director of the United States Patent and Trademark Office*